2 Sheets—Sheet 2.

A. D. MARTIN.
ROAD ENGINE.

No. 188,300. Patented March 13, 1877.

Witnesses:
Thomas H. Parsons.
J. R. Drake.

Albert D. Martin
Inventor,
By
J. R. Drake
Atty.

UNITED STATES PATENT OFFICE.

ALBERT D. MARTIN, OF EDEN, NEW YORK, ASSIGNOR OF ONE-HALF HIS RIGHT TO ALBERT HENRY CASE, OF SAME PLACE.

IMPROVEMENT IN ROAD-ENGINES.

Specification forming part of Letters Patent No. 188,300, dated March 13, 1877; application filed December 29, 1876.

*To all whom it may concern:*

Be it known that I, ALBERT D. MARTIN, of Eden, in the county of Erie and State of New York, (assignor of one-half to ALBERT HENRY CASE, of same place,) have made certain Improvements in Traction-Engines, of which the following is a specification:

This invention is for farm and other purposes; and consists in the manner and means of applying the power of the engine to the driving-wheels.

Figure 1:
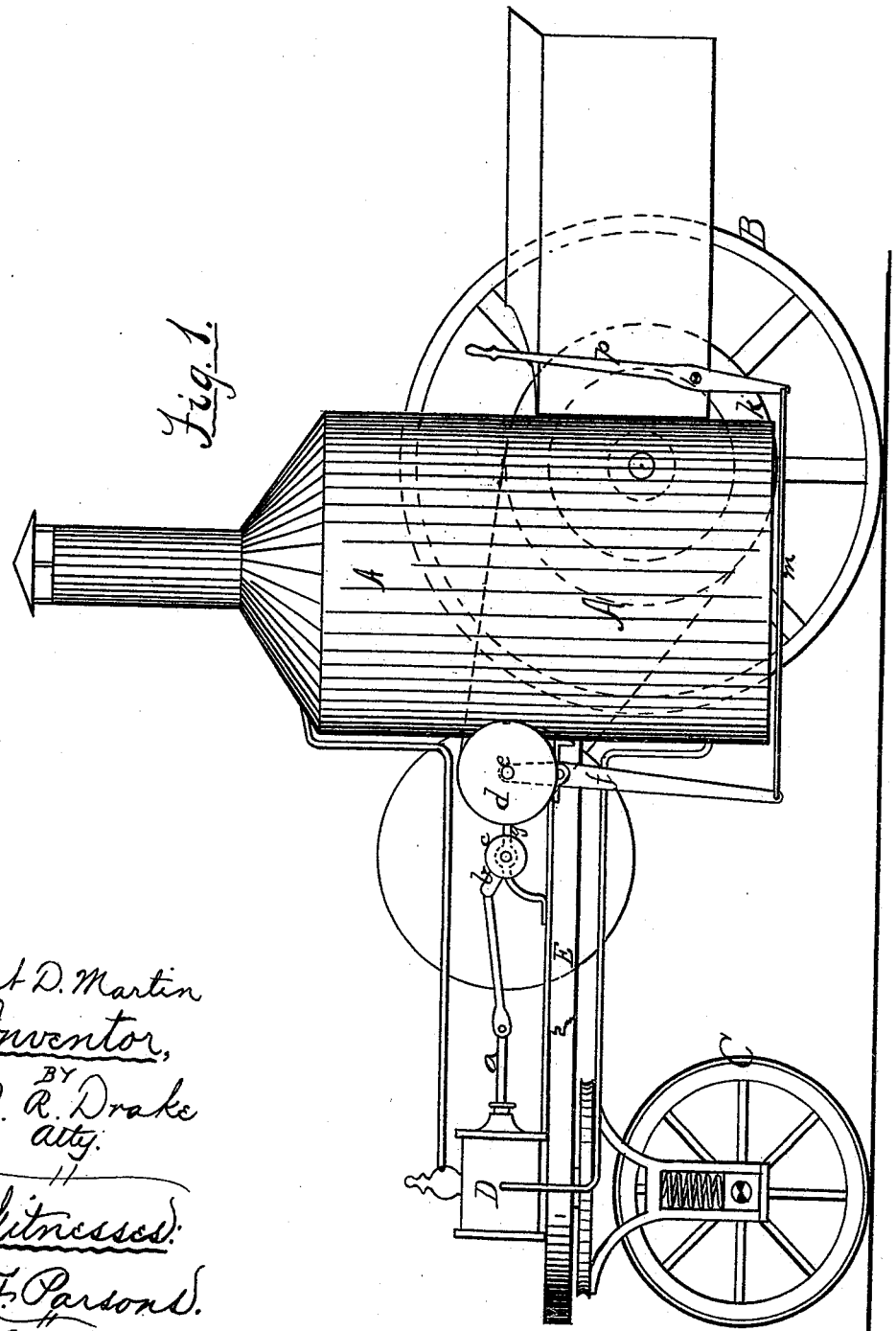
Figure 2:
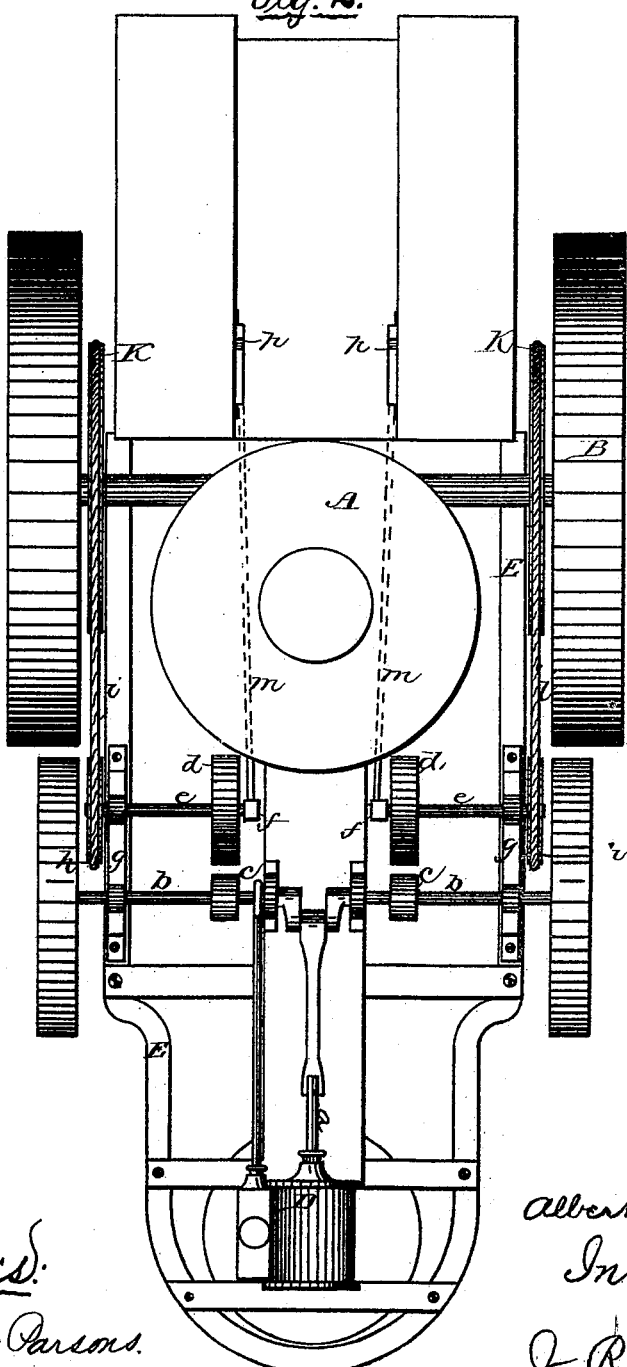

In the drawings, Figure 1 is a side elevation, partly in section; Fig. 2, a plan.

A represents the boiler; B B, the two driving-wheels, and C the front or steering-wheel, which is operated from the foot-board by a hand-wheel, as is usual. D is the cylinder, placed just over the front wheel, and $a$ is the piston, which drives the crank-shaft $b$. On this shaft are two small friction-pulleys, $c\ c$, which come in contact with independent and larger friction-wheels $d\ d$, on short independent shafts $e\ e$, said short shafts being each sustained in position by the inner ends running in bearings on the end of upright, pivoted, and swinging levers $f f$. The other ends of the shafts $e\ e$ are set in loose bearings in a frame, $g\ g$, attached to the outside of, or top of, the main frame E of the engine. The crank-shaft $b$ runs in the same frame $g\ g$, and on each end (outside) is a balance-wheel, which can also be used with belts, to run farm or other machinery, cutting feed, sawing, thrashing, hauling loads, &c.

On the outer end of each of the short shafts $e\ e$ is a grooved wheel, $h$, operated by a chain, (or other connection,) $i$, which runs, also, on a large grooved wheel, $k$, attached to the inner part of the regular driving-wheels B. These wheels $k\ k\ h\ h$, and friction-wheels $d\ d$, propel the engine, when said friction-wheels are in contact with the friction-pulleys $c\ c$ on the crank-shaft $b$. These friction-wheels are thrown in and out of connection as follows: The lower end of the pivoted swinging-lever bearings $f f$ are attached to horizontal rods $m\ m$, under the machine, and their ends attached to pivoted hand-levers $p\ p$, which come up at the right and left of the foot-board, to be easily operated by the engineer. The short shafts $e\ e$ of the friction-wheels $d\ d$ have a side play in the bearings $g\ g$, so that when either or both of the levers $p\ p$ are pulled they disconnect the friction-pulleys $c\ d$ from each other, and stop the driving wheel or wheels. Pushing the lever-handles $p\ p$ forward connects the friction-wheels and starts the machine running. These levers operate independently, so that in turning, a great advantage is gained by disconnecting one side and running the other. The engine can thus be turned within its own length. A slight movement of the hand-levers will throw the friction-wheels in contact, making the engine very easy to control.

I claim—

In a traction-engine, the combination, with the main driving-wheels B, of the pulleys $k$, pulleys $h$, shafts $e$, friction-wheels $d$, friction-pulleys $c$, crank-shaft $b$, piston $a$, and cylinder D, all constructed and arranged for operation as herein shown and described.

In witness whereof I have hereunto signed my name in the presence of two subscribing witnesses.

ALBERT D. MARTIN.

Witnesses:
   J. R. DRAKE,
   ALBERT H. CASE.